United States Patent

[11] 3,578,001

| [72] | Inventor | Thomas J. Attaway |
| | | 50 S.E. 14th St., Dania, Fla. 33304 |
| [21] | Appl. No. | 854,064 |
| [22] | Filed | Aug. 29, 1969 |
| [45] | Patented | May 11, 1971 |

[54] AUTOMATIC ELECTRO-PNEUMATIC CONTROL APPARATUS FOR CAR WASHING SYSTEM
10 Claims, 10 Drawing Figs.

[52] U.S. Cl. ............................................ 134/45, 134/57
[51] Int. Cl. ............................................ B60s 3/04
[50] Field of Search ............................................ 134/45, 57 (R), 123

[56] References Cited
UNITED STATES PATENTS

| 3,079,935 | 3/1963 | Padek | 134/45 |
| 3,321,793 | 5/1967 | Braunger | 134/45X |
| 3,419,022 | 12/1968 | Youngren, Sr. et al. | 134/45 |
| 3,433,236 | 3/1969 | Koch et al. | 134/45 |
| 3,448,717 | 6/1969 | Kuhlman | 134/45X |
| 3,506,020 | 4/1970 | DeNiro | 134/45 |

Primary Examiner—Robert L. Bleutge
Attorney—Polachek and Saulsbury

ABSTRACT: Apparatus for automatic control of a vehicle washing system includes a flexible pad wider than the bearing surface of a vehicle wheel. The pad containing gas or liquid is connected via a hose to a pneumatically or hydraulically operated timer switch. The pad is provided with means such as suction and or a weight to prevent displacement when a vehicle rolls over it. The timer switch automatically opens a circuit keeping an electrically controlled valve closed to stop discharge of a detergent solution on the vehicle.

PATENTED MAY 11 1971

INVENTOR.
THOMAS J. ATTAWAY
BY
Polachek & Saulsbury
ATTORNEYS

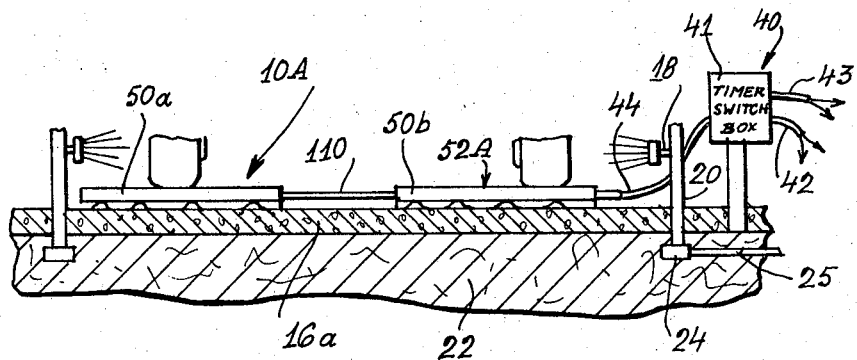
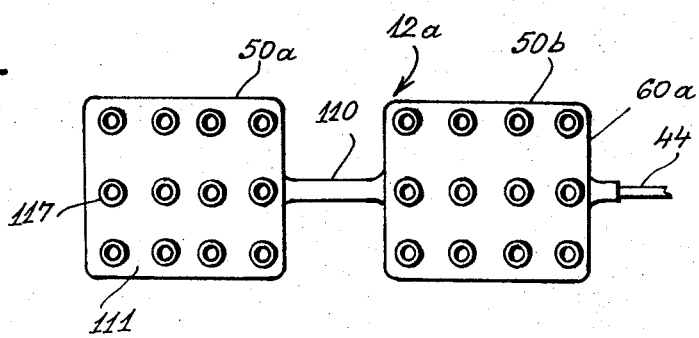
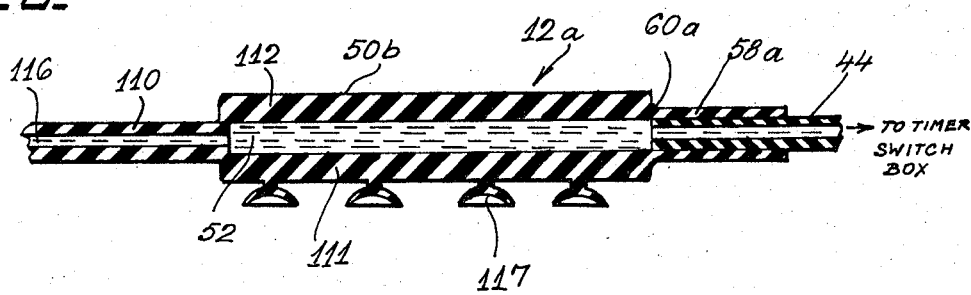

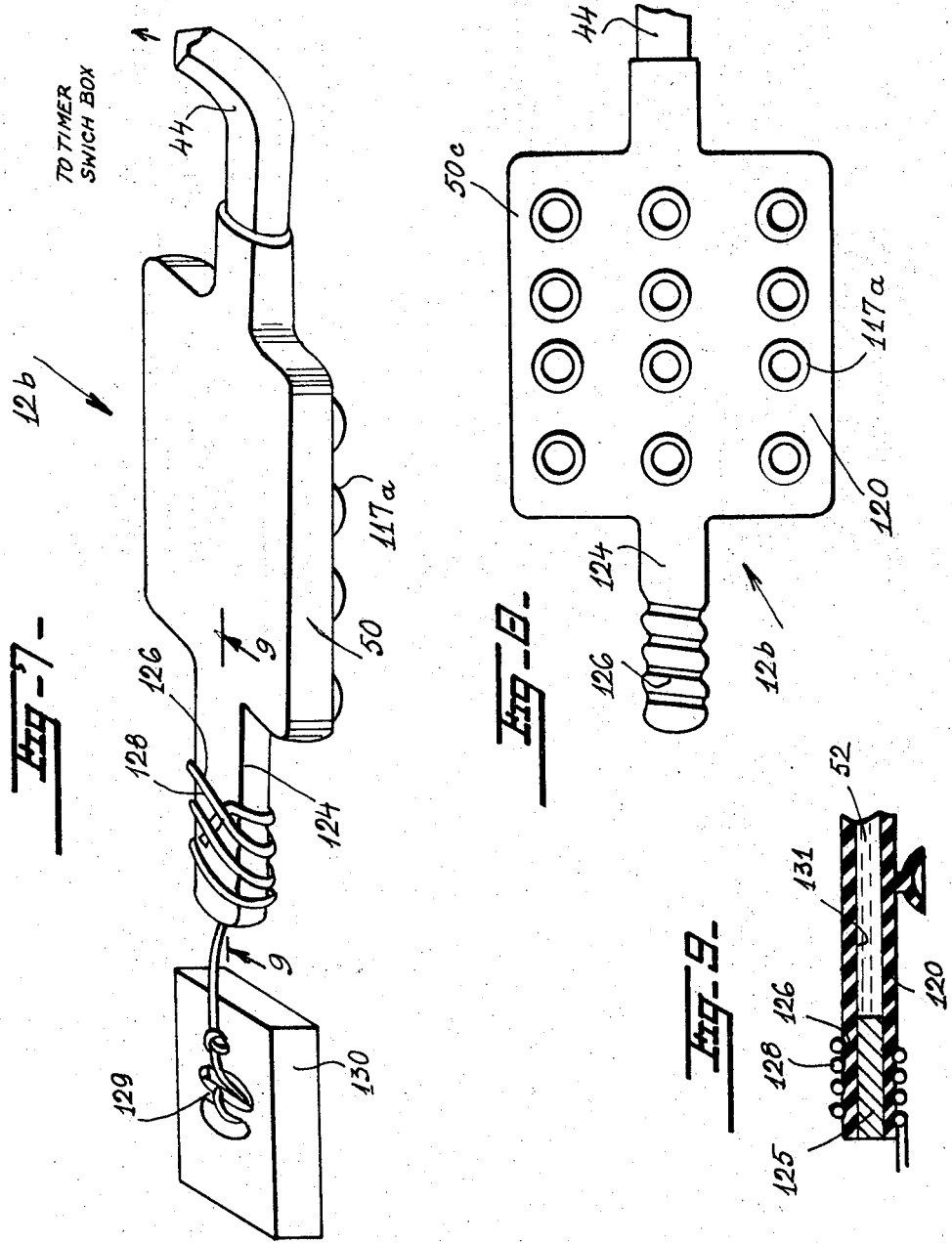

AUTOMATIC ELECTRO-PNEUMATIC CONTROL APPARATUS FOR CAR WASHING SYSTEM

This invention concerns pneumatically operated switch means particularly adapted for use in an automatically timed vehicle washing system.

It has been proposed heretofore to employ pneumatically operated switches for vehicle cleaning systems. U.S. Pat. No. 3,079,935 describes such a typical system. Such prior systems generally employ long, narrow hoses stretched across the pavement over which the vehicle passes to actuate the cleaning system. Such hoses have have proven unsatisfactory for several reasons. Since they are round they twist and scrape on the ground and soon wear out. The are easily cut and torn by hard objects embedded in tires of vehicle passing over them. They roll and move around on the ground. This displacement disorganizes the switching and cleaning apparatus because the cycle of cleaning begins too soon or ends to late after the vehicle passes over the displaced pneumatic hose.

The present invention is directed at overcoming the above and other difficulties and disadvantages of the prior systems by providing novel wide anchored pneumatic or hydraulic pads for actuating a switch timing device in vehicle cleaning apparatus.

The invention will be explained in further detail in connection with the drawings, wherein:

FIG. 3 is a front elevational view similar to a portion of FIG. 1 showing another embodiment of the invention.

FIG. 5 is an enlarged fragmentary sectional view taken on line 5–5 of FIG. 4.

FIG. 6 is bottom plan view of the pads of FIGS. 3, 4.

FIG. 7 is a perspective view of another pneumatic or hydraulic pad.

FIG. 8 is a bottom plan view of the pad of FIG. 7.

FIG. 9 is a fragmentary sectional view taken on line 9–9 of FIG. 7.

Figure 1:
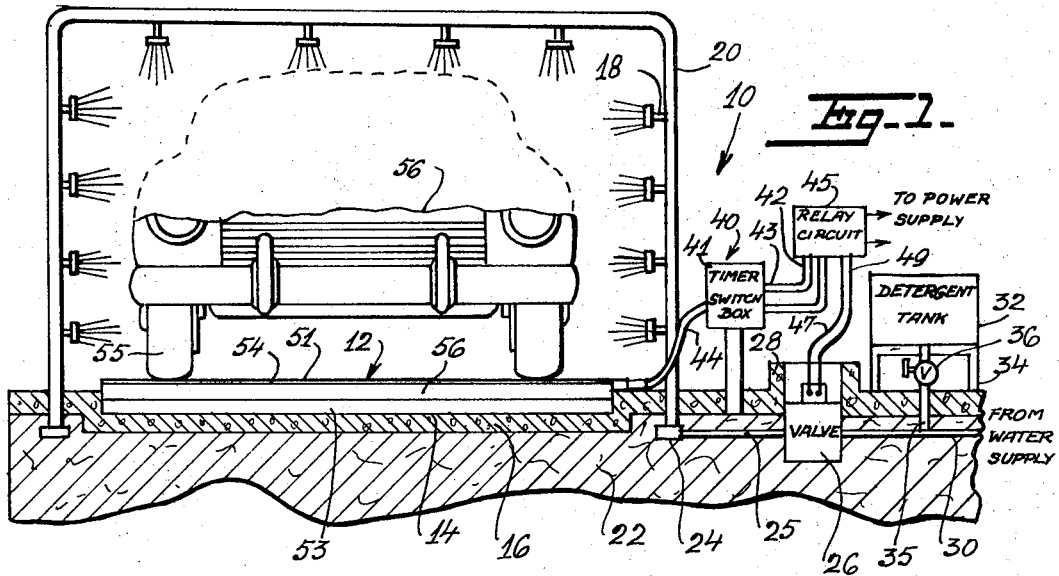
FIG. 1 is a front elevational view partially diagrammatic in form of a pneumatic or hydraulic system embodying the invention.

Referring first to FIG. 1 there is shown part of a vehicle washing system 10. A pneumatic pad 12 is set in a rectangular recess 14 formed in the concrete pavement 16 of a vehicle washing station. Sprinklers 18 are supported on an upright U-shaped pipe framework 20 set in the ground 22. One end of the framework terminates in a coupling 24 to which is connected a pipe 25 leading to an electrically controlled fluid valve 26. The valve is set in a wall 28. Connected to the valve is a water supply pipe 30. A tank 32 containing a suitable detergent is supported on a frame 34 laterally of framework 20. The tank is connected to pipe 30 via pipe 35 to mix detergent with the water supply. A valve 36 on pipe 36 controls the relative mixture of detergent and water. A timer switch assembly 40 in box 41 is connected by wire cables 42, 43 to relay circuit 45. Wires 47, 49 are connected between valve 26 and relay circuit 45. A hose 44 connects pad 12 with the timer switch assembly 40.

Figure 2:
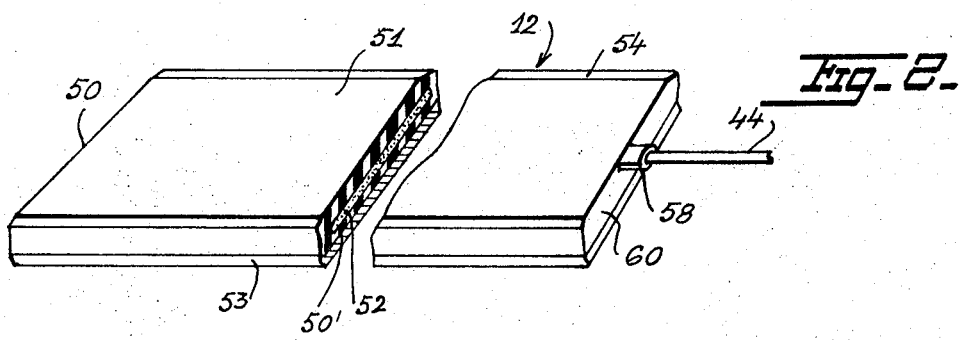
FIG. 2 is an enlarged perspective view with parts broken away of a pneumatic or hydraulic pad employed in the system.
Figure 4:
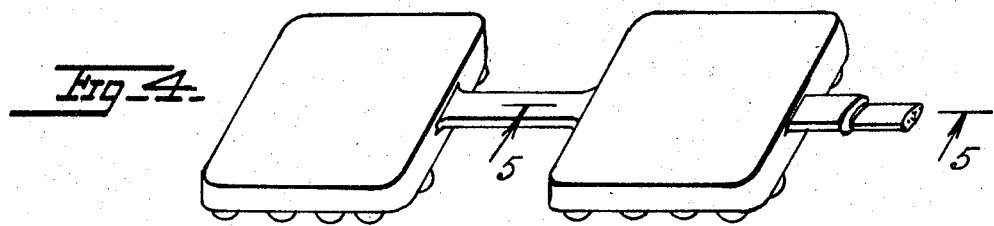
FIG. 4 is a perspective view of a pneumatic or hydraulic pad employed in the system of FIG. 3.

Pad 12 is shown to best advantage in FIG. 2. This pad has a long, wide, flat casing 50 made of tough resilient material such as artificial rubber. Inside the casing is a closed chamber 50'. This chamber may contain a gas such as air or it may contain a liquid 52 such as oil or water. Use of liquid has certain advantages described below. The contents of the chamber whether gas or liquid will be referred to as "fluid."

The casing 50 is detachably secured to a metal plate 53 which serves to reinforce the structure and which serves as a stabilizer for the pad in recess 14. Opposite upper forward and rear edges 54 of the casing top 51 may be rounded or beveled to permit wheels 55 of vehicle 56 to roll over the pad easily with minimum abrasion of the pad. Hose 44 is securely connected to nipple 58 integrally formed with end wall 60 of casing 50.

Figure 10:
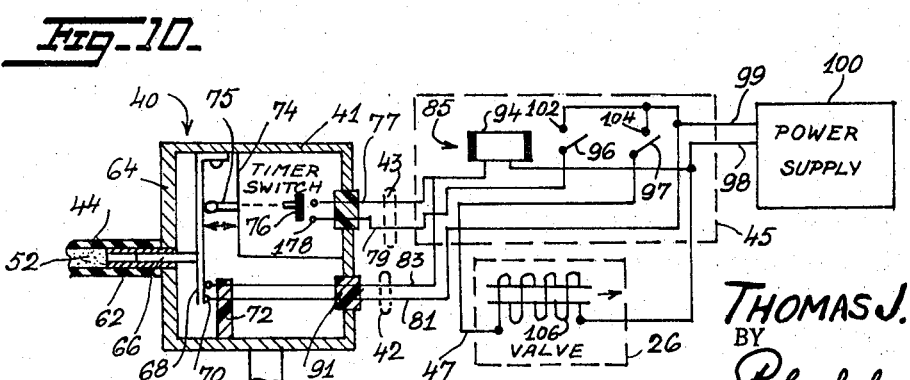
FIG. 10 is a diagram of an electropneumatic circuit according to the invention.

The timer switch assembly 40 at which hose 44 terminates is best shown in FIGS. 1 and 10 to which reference is now made. Hose 44 is secured to a cylinder 62 sealed to sidewall 64 of the box 41. Slidably disposed in cylinder 62 is a piston 66. The outer end of the piston is exposed to fluid 52 which may be a gas or liquid as mentioned above. The inner end of the piston bears against a leaf spring or diaphragm 68 secured to the top of the box. The lower end of the spring is free. A pair of fixed spaced contacts 70 supported on insulated plate 72 are disposed to be contacted by conductive spring 68. A timer switch 74 in box 41 has an operating arm 75 disposed to be pushed inwardly by spring 68 when piston 66 moves inwardly of the box. Arm 75 is operatively connected to switch bar 76 for closing spaced fixed contacts 78. Connected to these contacts are 77, 79 of cable 43. Wires 81, 83 in cable 42 are connected from contacts 70 to relay 85 in relay circuit 90. The wires extend through insulators 91 in the wall of box 41.

The relay circuit includes a relay coil 94. One end of coil 94 is connected to wire 77. Wire 79 is connected to movable contact 96. The other end of coil 94 is connected to terminal 98 of power supply 100. Fixed contacts 102 and 104 and wire 81 and connected between one end of solenoid coil 106 in valve 26 and movable contact 97 of the relay. The other end of the solenoid coil 106 is connected by wire 49 to power supply terminal 98. Wire 83 is connected to one end of coil 94. Wires 77 and 79 are connected to normally open contacts 78. Wires 81, 83 are connected to normally open contacts 78. Wires 81, 83 are connected to normally open contacts 70.

In operation of system 10, vehicle 56 rides up on pad 50. Since the pad is wide in the direction of movement of the vehicle, the upper wall 51 of the pad fully supports the front wheels 55 of the vehicle. The top wall 51 is thick and flexible. When the wall 51 flexes it forces fluid 52 through hose 44 to cylinder 62 and piston 66 is driven inwardly against spring 68. The use of liquid in this arrangement is desirable since liquid is generally incompressible so that the force of compression of the pad by the vehicle is effectively transmitted by movement of liquid to drive piston 66 against spring 68. Spring 68 moves laterally to close contacts 70 and to move switch arm 75 to close switch bar 76 with contacts 78. The timer now operates runs for a predetermined time. When contacts 70 close with spring 68, relay 85 is energized and contacts 96, 102 and 97, 104 close. Closing of contacts 97, 104 energizes valve 26 to open and pass a mixture of solution of water and detergent through pipe framework 20 to the sprinklers 18.

In some washing installations the vehicle 56 may be pushed or pulled continuously through the washing station and may leave sprinklers 18 to pass to another washing position where another detergent solution may be applied or only clean rinse water will be sprayed on the vehicle. In any case, wheels 55 may pass off pad 12 before the vehicle is completely sprayed and washed with the detergent solution. This causes release of fluid pressure and contacts 70 open. However the solution will continue to be sprayed because valve 26 remains actuated. This occurs because the closing of relay contacts 96, 102 close a holding or latching circuit to keep relay coil 94 continuously energized. Subsequent closing of contacts 70 when the rear wheels of the vehicle pass over pad 12 does not affect the circuit since contacts 70 and 78 remain closed. After the rear wheels of the vehicle roll off the pad 12 the set time of timer switch 74 expires and switch bar 76 opens contacts 78. This opens the holding or latching circuit including contacts 78, wires 77 and 79, relay coil 94, contacts 96, 102 and the power supply 100. Thus the relay becomes deenergized and contacts 97, 104 open to deenergize solenoid coil 106. Thus the supply of detergent solution to the sprinklers 18 is automatically shut off.

FIGS. 3–6 shown system 10A including another pneumatic pad 12a which can be used in place of pad 12 in installations where there is no recess 14 provided in the pavement 16 as shown in FIG. 1. The pad has two casings 50a and 50b joined by an integral, central, wide flat, flexible conduit 110. Chambers 112 in the two casings containing fluid 52 communicate with each other through passage 116 in conduit 110. The bottoms 111 of both casings have integrally formed suction cups 117 which securely engage the flat pavement 16a. Hose 44 is connected to nipple 58a at end wall 60a of casing 50b. Other parts of the system 10A corresponding to those of system 10 are identically numbered.

System 10A operates like system 10 with passage of fluid 52 through hose 44 initially activating the discharge of detergent solution from sprinklers 18. Timing operates in the same way as described. The casings 50a and 50b effectively support the wheels of the vehicle and the full bearing surfaces of the wheels on the casings are effective to operate system.

FIGS. 7, 8 and 9 shown another flexible pad 12a which can be used in installations where the double casings of pad 12a or the weighted casing of pad 12 are not desired. In pad 12b, casing 50c is provided with suction cups 117a integrally formed with its bottom wall 120. A sleeve 124 extends from one end wall and is closed by a rigid plug 125. A helical groove 126 is formed in sleeve 124. Flexible cable 128 can be engaged in groove 126 at one end. The other end of the cable will be tied to cross bar 129 of a massive weight 130. This weight will cooperate with suctions cups 117a in keeping the pad in stationary position on a pavement in a vehicle washing station. Chamber 131 contains fluid 52 for operating the system automatically. Pad 128 will operate like pad 12 in actuating the valve 26 for discharge of detergent solution, and the timing cycle will also operate as previously described.

In all systems described, a primary purpose is served by insuring that the pneumatic or hydraulic pads remain stationary and are not displaced by movement of the vehicle on or off them or by liquid flowing around them. The pads are massive in construction. They will withstand much rough wear and will provide long, satisfactory heavy duty service.

I claim:

1. Apparatus for automatic control of a vehicle washing system at a vehicle washing station having a spray frame therein, comprising a flexible pad, said pad including a wide flat casing with a fluidtight chamber therein for containing fluid; said casing having a flat bottom for resting on a pavement over which wheels of a vehicle roll while passing in one direction through the vehicle washing station, the width of said pad in the direction of movement of the vehicle being greater than the length of the bearing surface on the pavement of each of said wheels so that the pad fully supports at least one wheel when the wheel is on the pad; means for preventing displacement of the pad when the vehicle rolls over the pad; and a flexible hose connected at one end thereof to one end of the pad for conducting fluid therefrom to effect discharge of a detergent solution from said spray frame onto the vehicle.

2. Apparatus as defined by claim 1, wherein said means comprises suction cups secured to the bottom of the pad for pneumatically engaging the pavement to prevent displacement of the pad when the vehicle rolls over the pad.

3. Apparatus as defined by claim 2, wherein said means further comprises a massive weight secured to the other end of the pad to prevent displacement of the pad when the vehicle rolls over the pad.

4. Apparatus as defined by claim 1 wherein the pad further comprises a second casing having another fluidtight chamber therein for containing fluid; said casing having a flat bottom for resting on the pavement, the width of the second casing being substantially the same as the first named casing; a flexible conduit joining the chambers in both casings to conduct fluid therebetween; said means comprising suction cups secured to the bottoms of both casings for pneumatically engaging the pavement to prevent displacement of the pad when the vehicle rolls over the pad.

5. Apparatus as defined by claim 1, wherein said means comprises a massive, rigid plate secured to the bottom of the casing and adapted to seat in a recess in said pavement.

6. Apparatus as defined by claim 1, wherein the apparatus further comprises an electromechanical timer switch; a switch box, said hose having its other end terminating at said switch box; spring means in the box disposed to move and operate said timer switch; and piston means at the other end of the hose movable by fluid in the hose to operate the timer switch.

7. Apparatus as defined by claim 6, further comprising an electromechanical valve for controlling discharge of said detergent solution; relay means connected in circuit with said valve for operating the same; and electrical contact means connected in circuit with the relay means and disposed for closing by said spring means to close said valve and discharge said solution when pressure of the weight of a vehicle is placed upon the pad.

8. Apparatus as defined by claim 7, wherein the relay means includes a holding circuit for keeping the relay energized once said contact means are closed, said timer switch having other contacts connected in the holding circuit and arranged to open the same a predetermined time after the timer switch is operated by movement of said spring means, whereby the valve is opened and the discharge of said detergent solution is stopped.

9. Apparatus as defined by claim 1, wherein said means comprises a massive weight secured to the other end of the pad to prevent displacement of the pad when the vehicle rolls over the pad.

10. Apparatus as defined by claim 9, wherein said weight is secured to the other end of the pad by a flexible cable.